United States Patent [19]
Miles et al.

[11] Patent Number: 6,010,674
[45] Date of Patent: Jan. 4, 2000

[54] METHOD FOR CONTROLLING CONTAMINANTS DURING NATURAL GAS DEHYDRATION

[75] Inventors: Bert B. Miles, Beggs; Gary W. Sams, Tulsa, both of Okla.

[73] Assignee: National Tank Company, Houston, Tex.

[21] Appl. No.: 08/076,000

[22] Filed: Jun. 11, 1993

Related U.S. Application Data

[62] Division of application No. 07/604,925, Oct. 28, 1990, Pat. No. 5,221,523.

[51] Int. Cl.[7] .......................... B01D 47/00; B01D 53/26; B01D 53/72; E21B 43/34
[52] U.S. Cl. ............................. 423/245.3; 431/5; 95/184; 95/193; 95/231
[58] Field of Search ............................. 95/231, 184, 209, 95/193; 203/18; 423/245.3; 431/5

[56] References Cited

U.S. PATENT DOCUMENTS

| | | | |
|---|---|---|---|
| 2,725,337 | 11/1955 | Laurence et al. | 196/11 |
| 3,395,512 | 8/1968 | Finney et al. | 55/80 |
| 3,616,598 | 11/1971 | Foral, Jr. | 203/18 |
| 3,736,725 | 6/1973 | Alleman et al. | 95/194 |
| 3,855,337 | 12/1974 | Foral et al. | 95/231 |
| 3,904,351 | 9/1975 | Smith et al. | 431/284 |
| 3,932,111 | 1/1976 | Liknes et al. | 431/202 |
| 4,003,722 | 1/1977 | Holter | 55/68 |
| 4,035,171 | 7/1977 | Reed et al. | 96/190 |
| 4,162,145 | 7/1979 | Alleman | 55/32 |
| 4,182,659 | 1/1980 | Anwer | 203/18 |
| 4,227,897 | 10/1980 | Reed | 55/269 |
| 4,237,620 | 12/1980 | Black | 34/72 |
| 4,280,867 | 7/1981 | Hodgson | 159/47 |
| 4,292,024 | 9/1981 | Pobst | 423/460 |
| 4,322,265 | 3/1982 | Wood | 203/18 |
| 4,494,967 | 1/1985 | Barth | 55/74 |
| 4,676,806 | 6/1987 | Dean et al. | 55/20 |
| 5,084,074 | 1/1992 | Beer et al. | 95/231 |
| 5,163,981 | 11/1992 | Choi | 95/231 |
| 5,167,675 | 12/1992 | Rhodes | 95/231 |
| 5,209,762 | 5/1993 | Lowell | 95/231 |
| 5,234,552 | 8/1993 | McGrew et al. | 55/222 |

FOREIGN PATENT DOCUMENTS

| | | | |
|---|---|---|---|
| 71111 | 2/1983 | European Pat. Off. | 423/245.3 |

OTHER PUBLICATIONS

Seebold, J. G. "Practical Flare Design", Chemical Engineering Dec. 10, 1984, pp. 69–72.

"Fundamentals of Natural Gas Conditioning" by R.N. CUrry pp. 33, 41–49 (1981).

*Primary Examiner*—Steven P. Griffin
*Assistant Examiner*—Peter DiMauro
*Attorney, Agent, or Firm*—Head, Johnson & Kachigian

[57] ABSTRACT

A system for controlling organic contaminants released from a regenerator during the process of liquid dehydration of natural gas where contaminants are vaporized into a gaseous mixture. The system includes conducting the vaporized mixture from the regenerator to a heater, heating the vaporized mixture in the heater, conducting the vaporized mixture from the heater to a liquid collection chamber where suspended liquid particles are separated out from the vaporized mixture, drawing the vaporized mixture from the liquid chamber using fuel gas as an aspirator, mixing atmospheric air with the vaporized mixture, and combusting the vaporized mixture in order to incinerate the vaporized mixture.

5 Claims, 3 Drawing Sheets

METHOD FOR CONTROLLING CONTAMINANTS DURING NATURAL GAS DEHYDRATION

CROSS-REFERENCE TO RELATED APPLICATION

This is a divisional application of U.S. patent application Ser. No. 07/604,925 filed Oct. 28, 1990, now U.S. Pat. No. 5,221,523. This is a divisional application of copending Ser. No. 07/604,925 filed Oct. 29, 1990.

BACKGROUND OF THE INVENTION

1. Field of the Invention

The present invention relates to a system to incinerate contaminants released in the regeneration or reconcentration process of glycol dehydration of natural gas.

2. Prior Art

Natural gas processing includes removal of contaminants from the natural gas in order to produce a transportable natural gas product. One of the major contaminants removed during processing is water vapor in the gaseous state and water in condensed form. Other contaminants present in smaller quantities are heavy hydrocarbons, solid matters such as sand, and acid gasses.

There are two methods for removing water from natural gas. Although dry desiccants are utilized in some applications, liquid absorbent systems are most frequently used.

Most large volume dehydration units are of the glycol type. Glycol is advantageous because it has a relatively high boiling point, is thermally stable and does not oxidize in normal use. The media used is glycol of one of three kinds: ethylene, diethylene, or triethylene, with triethylene or "teg" the most frequently used. Water in natural gas is absorbed by contact with teg.

A typical dehydration facility normally consists of an inlet gas scrubber and separator where liquid accumulations are removed. The gas is then directed to a gas contactor where the triethylene glycol comes into contact with the gas, a majority of the water vapor being absorbed by the glycol. The dehydrated gas leaves the contactor tower where it is directed to be transported for use. The wet glycol is directed from the contactor tower through a series of skimmers and filters and then to a reconcentrator or reboiler column.

In the reboiler column, the water saturated glycol is heated to a temperature of between 380° to 400° Fahrenheit to boil off the water. At the same time, it is advisable to maintain the reboiler at the lowest possible pressure so that the water solubility of glycol is not increased.

The vaporized water, along with the contaminants not removed with the skimming and filtration process, are typically vented to the atmosphere. Venting these contaminants to the atmosphere is becoming an in creasing environmental problem. These odorous vapors emitted from the reboiler create uncomfortable living conditions and health concerns for local residents and workers. It is to this problem that the present invention is directed.

A patentability search was conducted by the Applicant on the present invention and the following U.S. patents represent the results of the search:

Patent Patentee Issue Date
U.S. Pat. No. 4,237,620 Black Dec. 9, 1980
U.S. Pat. No. 4,494,967 Barth Jan. 22, 1985
U.S. Pat. No. 4,676,806 Dean et al. Jun. 30, 1987
U.S. Pat. No. 3,395,512 Finney et al. Aug. 6, 1968
U.S. Pat. No. 4,280,867 Hodgson Jul. 28, 1981
U.S. Pat. No. 4,182,659 Anwar et al. Jan. 8, 1980
U.S. Pat. No. 4,162,145 Alleman Jul. 24, 1979
U.S. Pat. No. 2,725,337 Laurence et al. Nov. 29, 1955
U.S. Pat. No. 4,003,722 Hölter Jan. 18, 1977

Hodgson (U.S. Pat. No. 4,280,867) discloses a reboiler used to heat wet glycol and water vapor is discharged. The dehydrated glycol then flows through a stripping column where glycol comes into contact with dry flue gas generated by a catalytic burner.

Anwar et al (U.S. Pat. No. 4,182,659) provides a system where wet glycol is initially drawn off into an expansion chamber where part of the hydrocarbon gases absorb, are drawn off and may be re-used as heating gas. The glycol is then heated to remove the majority of the water which is vented to the atmosphere. Finally, the glycol is heated at sub-atmospheric pressure (vacuum) to further purify it.

Hölter (U.S. Pat. No. 4,003,722) discloses a system where gas may be purified by cleansing fluid. The cleansing fluid may be admitted into a flow circuit into an evaporator causing the impurities to be evaporated by heating. The impurities liberated in the evaporator are conveyed to a burner or combustion chamber and combusted.

Accordingly, it is a principal object and purpose of the present invention to provide a system for control and disposal of contaminants released in the glycol regeneration process without venting such contaminants to the atmosphere.

It is a further object and purpose of the present invention to provide a system for control and disposal of contaminants released in the glycol regeneration process wherein the contaminants may be incinerated without production of odors or visible emissions.

It is a further object and purpose of the present invention to provide a system for control and disposal of contaminants released in the glycol regeneration process which will not add undue back pressure to the reboiler.

SUMMARY OF THE INVENTION

Water and hydrocarbon contaminants are removed from natural gas during processing. Liquid absorbent systems utilizing glycol remove the water and other contaminants from the natural gas. In a reboiler or regenerator, the contaminant laden glycol is retained at low pressure while being heated so that the water and other contaminants are vaporized.

The vaporized mixture is directed from a vapor outlet of the reboiler to an in-line arrestor which prevents flame propagation. The vaporized mixture is then directed to a heating coil where the vaporized contaminants are heated to reduce liquid carryover, promote oxidation and complete combustion.

The vaporized mixture is then conducted to a liquid collection chamber wherein liquid particles will fall to a blow case beneath the liquid collection chamber. The liquid accumulated in the blow case may be periodically drained or forced out of the blow case.

The remaining vaporized mixture is then conducted to an aspirator wherein fuel gas, under pressure, is mixed with the vaporized mixture and is used as a force to move the vaporized mixture from the liquid collection chamber through the aspirator.

An optional passive heat exchange device promotes condensation and dropout of any liquid particles being carried by the vaporized mixture.

The remaining vaporized mixture is then conducted to an inspirator wherein a quantity of atmospheric air is entrained to support combustion of the mixture. The vaporized mixture is then conducted to a flare for incineration.

DETAILED DESCRIPTION OF THE PREFERRED EMBODIMENTS

Figure 1:
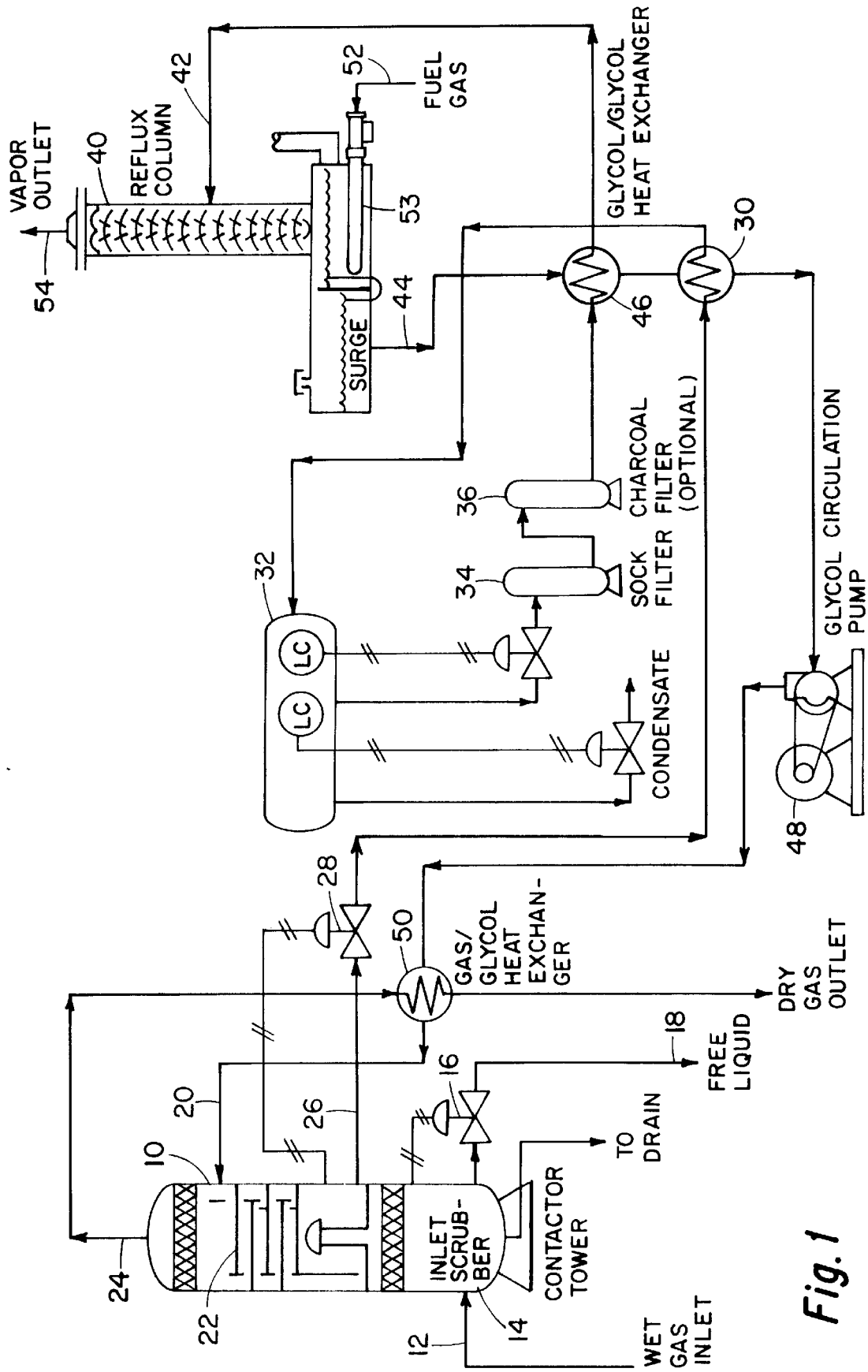
FIG. 1 is a diagram of a typical liquid dehydration system for natural gas which would utilize the present invention.

Referring to the drawings in detail, FIG. 1 is a diagram of a typical liquid dehydration system for natural gas which is well known. Various modifications may be made to this system although two major components are constant: a contactor tower where the liquid desiccant comes into contact with the natural gas and a reconcentrator or a reboiler.

Wet natural gas containing water and other contaminants enters a contactor tower 10 through a wet gas inlet 12. A portion of the free liquids existing in the natural gas mixture may be separated out by an inlet scrubber 14. Through a valve and switch arrangement 16, the free liquid thus separated out may be drained from the contactor tower by a free liquid outlet 18.

The natural gas mixture is allowed to proceed upward through the contactor tower 10. Dehydrated liquid glycol is introduced into the top of the tower through dry glycol inlet 20. The glycol is allowed to flow in a counter current direction to the natural gas mixture. Glycol and the gas mixture pass through packing material or trays 22. During this process, a majority of the water vapor and liquid water which includes suspended contaminants is absorbed by the dry glycol.

Dehydrated gas then is allowed to exit contactor tower 10 through dehydrated gas outlet 24 where it may be delivered to be transported for use.

The water and contaminant enriched glycol exits near the bottom of the contactor tower through glycol outlet conduit 26. A switch and valve arrangement 28 may control the flow of the glycol out of the contactor tower.

The glycol containing contaminants flows through a series of heat exchange and purification devices. In the system shown in FIG. 1, the glycol passes through a glycol to glycol heat exchanger 30, a skimmer 32, a sock filter 34 and a charcoal filter 36 before being delivered to a reboiler 40 via reboiler inlet 42. The skimmer and filters remove some particulate matter, however, a significant amount of contaminants remain.

The reboiler is composed of a still column. In the reboiler 40, the glycol is separated from the water vapor, liquid water and contaminants and then returned through glycol outlet 44 to the contactor tower 10 where the dehydration process is repeated. The dry glycol may also pass through glycol to glycol heat exchanger 46, a circulation pump 48 and additional gas to glycol heat exchange device 50 prior to being returned to the contactor tower.

In the reboiler 40, the glycol is heated to a temperature of between 380° and 400° Fahrenheit without increasing the pressure. At this temperature, the glycol will not degrade or vaporize. Fuel gas delivered by fuel gas conduit 52 may be used as the fuel to heat the glycol in a U-shaped firebox 53. The vaporized water which includes various contaminants will be evaporated and vented to the atmosphere through vapor outlet 54.

The foregoing illustrates a typical liquid dehydration process for natural gas and is provided by way of background only, and does not constitute the invention.

Figure 2:
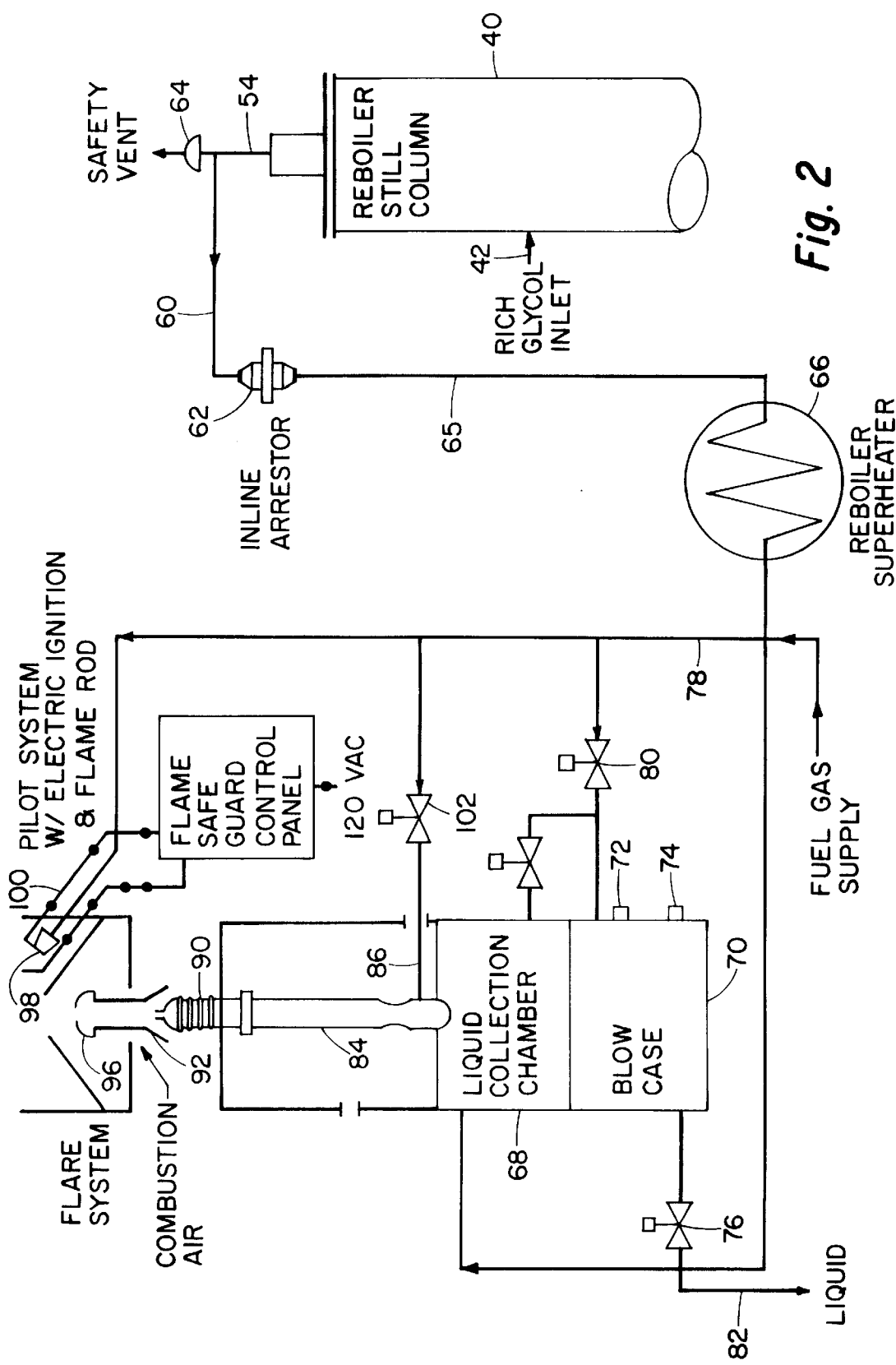
FIG. 2 is a diagram of a control system for contaminants constructed in accordance with the present invention.

The vaporized mixture that is emitted from the vapor outlet 54 in the reboiler 40 is increasingly perceived as an environmental problem, contaminating the surrounding atmosphere and the ground. A diagram of one embodiment of the present invention is shown in FIG. 2. The reboiler 40 is shown with vapor outlet 54 extending therefrom. Rather that being vented to the atmosphere, the vaporized mixture is directed through reboiler conduit 60 to an in-line arrestor 62. The conduit 60 may include a safety vent 64 in the event pressure in the system exceeds a predetermined amount. As will be described herein, the control system includes a flare mechanism to incinerate the contaminants. The in-line arrestor 62 is provided to assure that the flame does not travel back through the control system to the reboiler 40. Thus, the in-line arrestor prevents flame propagation. The in-line arrestor may consist of a stainless steel core with corrugated wrappings so that the vapor is required to pass through the arrestor.

After passage through the in-line arrestor 62, the vaporized mixture is directed through conduit 65 to a heating coil 66 where the vaporized contaminants are superheated to a minimum temperature of between 225° and 250° Fahrenheit. This has been found to be a minimum temperature range and higher temperatures may be utilized. This heating promotes oxidation and complete combustion of the vaporized mixture.

The heated vaporized mixture is then conducted to a liquid collection chamber 68 which consists of a "knock out" drum. The liquid collection chamber has a substantially larger diameter than the conduit so that the velocity of the vaporized mixture through the chamber is substantially slower than the conduit. The slower velocity encourages fall out of liquid particles. Liquid droplets that are separated from the vaporized mixture in the liquid collection chamber 68 will fall by force of gravity to a blow case 70 beneath the chamber 68. Through use of a liquid high level switch 72 and a liquid low level switch 74, the level of liquid in the blow case may be monitored. Since valve 76 is normally closed, the liquid will accumulate in the blow case.

As an alternative, a wire filter or other type of separator might be utilized to separate liquid particles from the vaporized mixture.

A source of fuel gas or pressurized air may be delivered to the blow case by conduit 78. When the liquid reaches the level of the high level switch 72, the valve 80 in the fuel gas supply may be switched opened along with the valve 76. Liquid in the blow case will be forced out through liquid conduit 82 where it may either be returned to the reboiler still column 40 or be directed to an approved disposal vessel (not shown). It has been found that the liquid droplets removed from the vaporized mixture contain a certain amount of glycol which are effectively recaptured by this process.

The remaining vaporized mixture in the liquid collection chamber 68 is then conducted to an aspirator 84 in communication with the chamber. The aspirator has an inlet connected to supply conduit 86 to allow fuel gas to be supplied thereto. Alternatively, if the vaporized mixture has a high enough hydrocarbon content to support combustion, a source of pressurized air might be used. The interior of the aspirator (not shown) will have a shape to take advantage of the venturi effect. Fuel gas under pressure of 10 to 20 psi has been found to be adequate. The fuel gas will be used as the motivating force to move the vaporized mixture through the aspirator 84 while maintaining the system at a relatively low operating pressure. Additionally, the fuel gas becomes thoroughly mixed with the vaporized mixture as it passes through the aspirator.

An optional heat exchange device 90 may be, connected to the aspirator. In the present embodiment, a finned tube condenser is utilized in a nature of a passive air heat exchange device. This heat exchange device will tend to cool the vaporized mixture and promote condensation and dropout of any liquid particles being carried by the vaporized mixture.

Gravity will then conduct any condensed liquid droplets back through the aspirator 84 and the liquid collection chamber into the blow case 70. As previously described, the liquid in the blow case will periodically be drawn or forced out through conduit 82.

The remaining vaporized mixture, now mixed with the supplemental fuel supply, is then conducted to an inspirator 92. A quantity of atmospheric air is entrained to support combustion of the vaporized mixture. The vaporized mixture is then conducted to a flare 96 for incineration of the hydrocarbons contained within the vaporized mixture. The flare 96 is operated in conjunction with a pilot flame 98 having an electric ignition 100. The elect ignition has a control system that senses pilot flame. In the absence of a flame, the pilot gas will shut off.

The pilot system may also operate in conjunction with a switch and valve 102 that controls the flow of fuel gas through conduit 78 into supply conduit 86.

Figure 3:
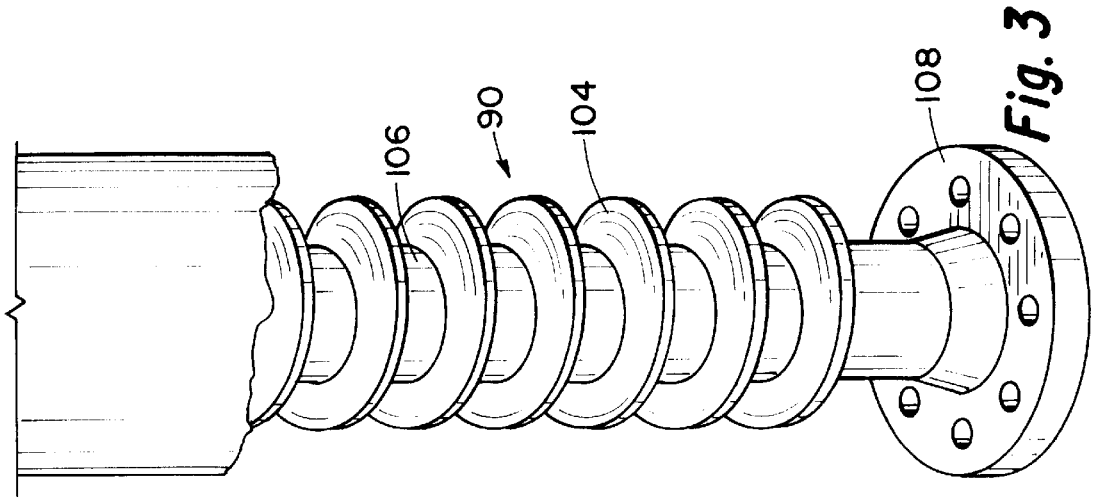
FIG. 3 is a cut-away perspective view of a heat exchange device of the control system.

FIG. 3 shows a perspective view cut-away in part to show the optional heat exchange device 90. Air is allowed to circulate around the fins 104 which extend from a tube 106 which contains the vaporized mixture. Passage of the vaporized mixture through the heat exchange device 90 will tend to cool the vaporized mixture and promote condensation and dropout of any liquid particles. The heat exchange device 90 may include a flange 108 to connect to the system.

Figure 4:
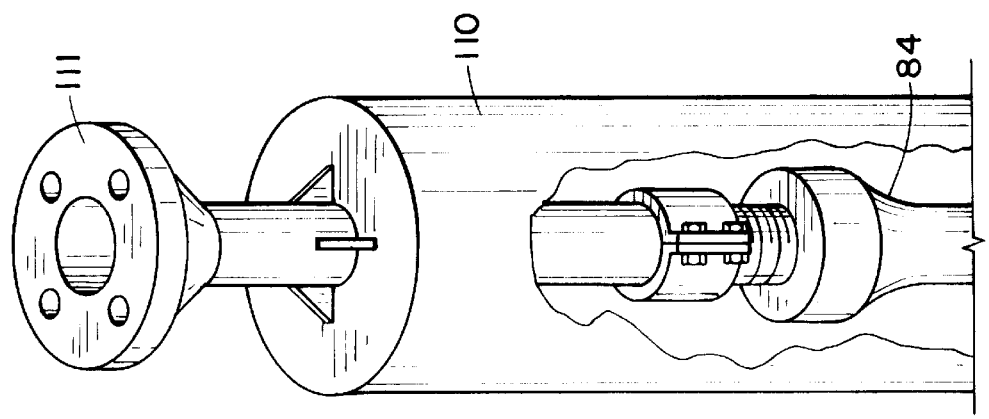
FIG. 4 is a perspective view of an aspirator of the control system.

FIG. 4 is a perspective view cut-away in part to show the aspirator 84. The exterior of the aspirator may be covered with a shell 110. A flange 111 extending from the aspirator may be connected to the flange 108 on the heat exchange device by bolts (not shown).

Figure 5:
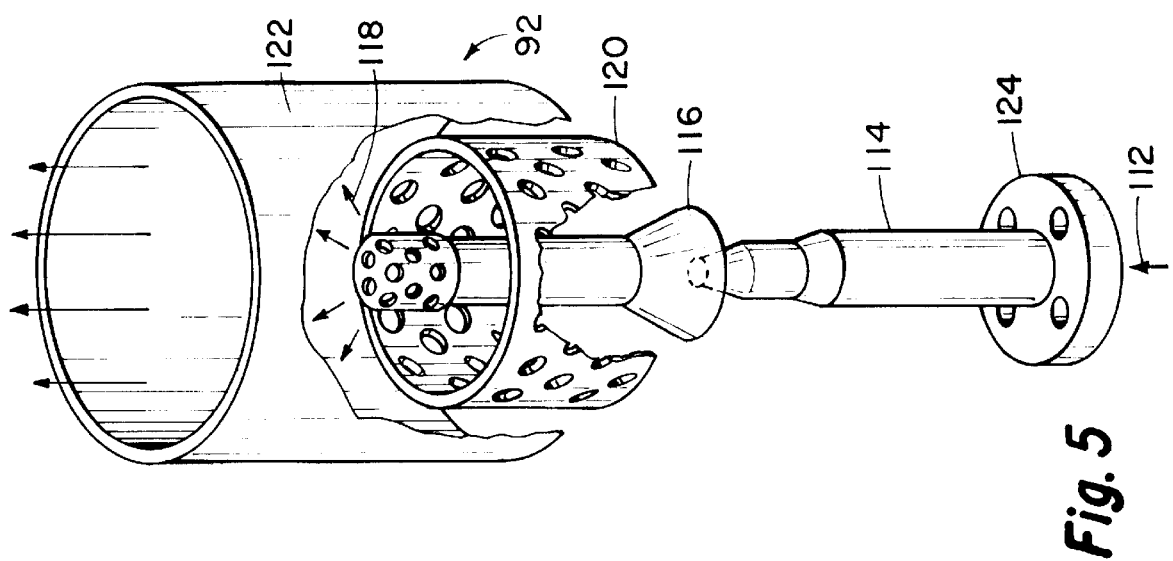
FIG. 5 is a perspective view of a flare of the control system.

FIG. 5 is an exploded view of the inspirator 92 and flare (96.) The vaporized mixture will enter as shown by arrow 112 into a removable orifice 114. Juxtaposed around and above the orifice 114 is a flare nozzle 116 which directs the vaporized mixture in the direction shown by arrows 118. A cylindrical internal windshield 120 surrounds the flare nozzle 116 which, in turn, is surrounded by cylindrical external wind shield 122, which may be refractory lined. A flange 124 would be connected to a flange (not shown) on the heat exchange device 90.

Primary atmospheric air is allowed to enter in the space between the orifice 114 and the flare nozzle 16. Secondary atmospheric air is allowed to enter in the space between the internal windshield 120 and the external windshield 122.

In the prototype system constructed, there has been no odorous or visible emission produced.

Whereas the present invention has been described in relation to the drawings attached hereto, it should be understood that other and further modifications, apart from those shown or suggested herein, may be made within the spirit and scope of this invention.

What is claimed is:

1. A method of controlling contaminants, at least some of which are organic, that are released from a regenerator during the process of liquid dehydration of natural gas where the contaminants are in the form of a vaporized mixture, which method comprises:

(a) conducting said vaporized mixture from said regenerator to a heater;

(b) heating said vaporized mixture in said heater;

(c) conducting said vaporized mixture from said heater to a liquid collection chamber;

(d) allowing suspended liquid particles to be separated out of said vaporized mixture in said liquid collection chamber, the liquid particles that are separated being collected in a blow case positioned under and in communication with the liquid collection chamber;

(e) drawing said vaporized mixture from said liquid collection chamber with an aspirator positioned within an upper portion of said liquid collection chamber using fuel gas for aspiration, whereby the said fuel gas and said vaporized mixture are mixed to increase the combustibility of the vaporized mixture;

(f) mixing atmospheric air with said vaporized mixture using an inspirator positioned above and in communication with said aspirator; and (g) combusting said vaporized mixture in order to incinerate said organic contaminants, steps (d), (e), (f), and (g) being carried out in a vertically oriented sequence.

2. A method of controlling contaminants released from a regenerator as set forth in claim 1 including, between step (e) and (f), passing said vaporized mixture through a heat exchanger after drawing said vaporized mixture from said liquid collection chamber and before mixing with said atmospheric air in order to promote condensation and dropout of liquid particles, said heat exchanger being vertically interposed between said aspirator and said inspirator.

3. A method of controlling contaminants released from a regenerator as set forth in claim 1 wherein said vaporized mixture is heated in said heater to a minimum temperature of between 225° and 250° F.

4. A method of controlling contaminants released from a regenerator as set forth in claim 1 including passing said vaporized mixture through a flame arrestor prior to entry into said heater in order to prevent flame propagation.

5. A method of controlling contaminants released from a regenerator as set forth in claim 1 including the step of conducting said liquid particles collected in said blow case back to said regenerator.

* * * * *